(12) United States Patent
Junczyk

(10) Patent No.: US 8,703,031 B2
(45) Date of Patent: Apr. 22, 2014

(54) METHOD FOR MAKING BRIQUETTES FROM COMMINUTED STRAW AND A DEVICE TO PRODUCE BRIQUETTES

(76) Inventor: Adam Piotr Junczyk, Biala Podlaska (PL)

( * ) Notice: Subject to any disclaimer, the term of this patent is extended or adjusted under 35 U.S.C. 154(b) by 0 days.

(21) Appl. No.: 13/378,533

(22) PCT Filed: Jun. 18, 2010

(86) PCT No.: PCT/PL2010/000049
§ 371 (c)(1),
(2), (4) Date: Dec. 15, 2011

(87) PCT Pub. No.: WO2010/147493
PCT Pub. Date: Dec. 23, 2010

(65) Prior Publication Data
US 2012/0091617 A1    Apr. 19, 2012

(30) Foreign Application Priority Data
Jun. 18, 2009  (PL) .......................................... 388314

(51) Int. Cl.
*B29C 47/38*    (2006.01)
(52) U.S. Cl.
USPC ................................................... 264/211.21
(58) Field of Classification Search
USPC ................................................... 264/211.21
See application file for complete search history.

(56) References Cited

FOREIGN PATENT DOCUMENTS

| AT | 401525 B | 9/1996 |
|---|---|---|
| CA | 2587025 A1 | 10/2008 |
| EP | 1193045 A1 | 4/2002 |
| GB | 2269131 A | 2/1994 |
| WO | 8705619 A1 | 9/1987 |
| WO | 0018572 A1 | 4/2000 |
| WO | 2009006752 A2 | 1/2009 |
| WO | WO 2009/006752 * | 1/2009 |

OTHER PUBLICATIONS

PCT International Search Report, PCT/PL2010/000049, Nov. 10, 2010.

* cited by examiner

*Primary Examiner* — Larry Thrower
(74) *Attorney, Agent, or Firm* — Westman, Champlin & Koehler, P.A.; Z. Peter Sawicki; Amanda Prose

(57) ABSTRACT

The subject of the invention is a method for the manufacture of briquettes from comminuted straw, as well as a device to manufacture briquettes from comminuted straw. The method consists in that comminuted straw is compressed in a continuous process using a screw-type extruder until the material reaches a temperature at which the material after pressing solidifies to a density exceeding 1.3 g/cm 3. The device has a screw (3) composed of three segments of decreasing helix pitches toward the outlet. The forming die (8) is housed in a tank (11) connected through a water system (12) to a cooler (13). The cooling system has a temperature sensor (17) installed, said sensor being part of the pump supply circuit (15).

1 Claim, 2 Drawing Sheets

…

Figure 1:
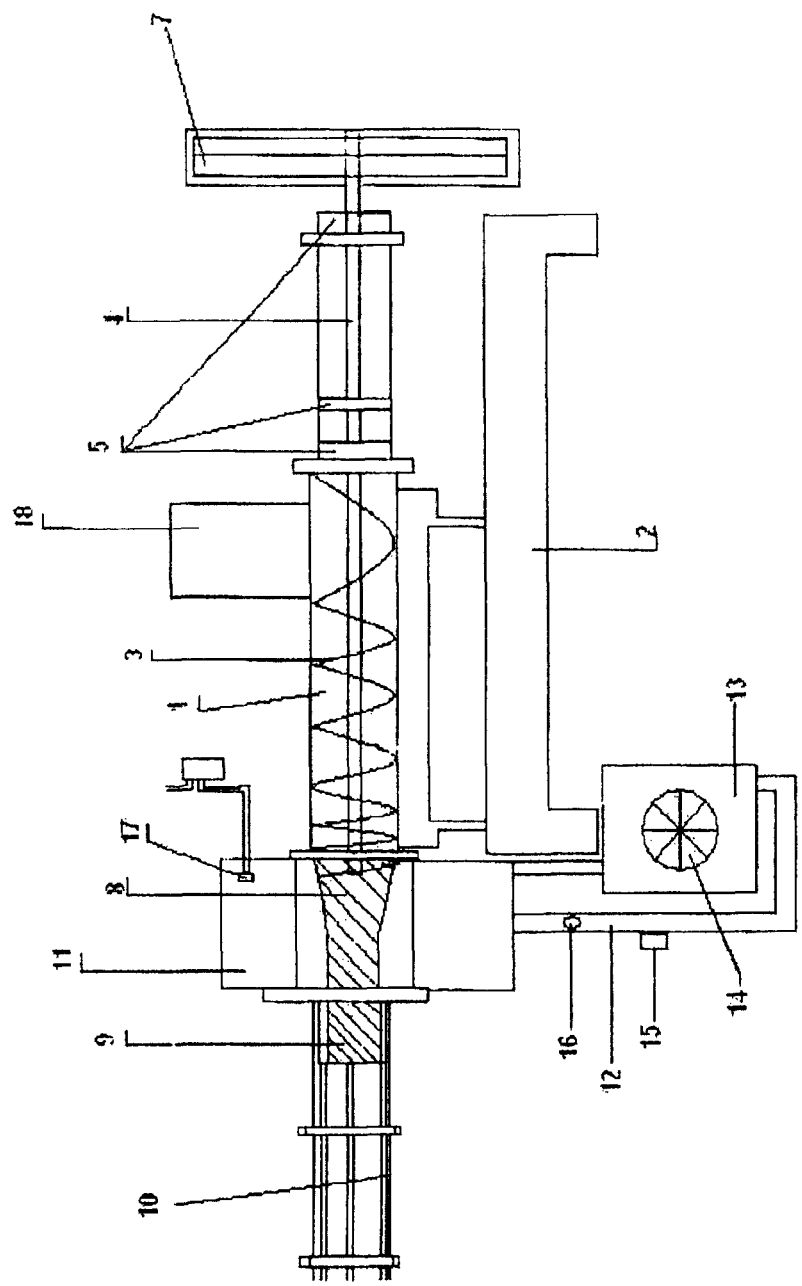

METHOD FOR MAKING BRIQUETTES FROM COMMINUTED STRAW AND A DEVICE TO PRODUCE BRIQUETTES

CROSS-REFERENCE TO RELATED APPLICATION

This Application is a Section 371 National Stage Application of International Application No. PCT/PL2010/000049, filed Jun. 18, 2010 and published as WO 2010/147493 A1 on Dec. 23, 2010, the content of which is hereby incorporated by reference in its entirety.

TECHNICAL FIELD

The subject of the present invention is a method for making briquettes from comminuted straw and a device for producing briquettes from comminuted plant waste.

PRIOR ART

Known methods for making briquettes from comminuted plant feedstock rely on compressing the raw material in a screw-type extruder while heating the extruder barrel and the forming die using electric heaters. During the compression the material solidifies, with the outer layer of a briquette formed having the most compact structure. In order to reduce cross-sectional heterogeneity of the resulting end product, the product is made in the form of a cylinder with a central hollow.

Polish patent No 198907 discloses a screw-type briquetting machine having a screw consisting of two segments, the first of which, counting from the inlet has a greater diameter and helix pitch than the other one which serves as a densifying segment of the screw. The barrel working chamber and the die are heated. Fitted at the face of the forming die is an annular die with a guide with pressure control. The screw is supported on bearings and actuated through an electric motor and a gearbox. The extruder barrel is equipped with a chute to supply the feedstock from a hopper. Solution to the problem

SUMMARY

According to the present invention, comminuted straw, pre-dried to a moisture content between 15 to 25%, is fed to a screw extruder and then gradually compressed until it reaches a temperature above 290° C. and a density above 1.3 g/cm$^3$, and the resulting mass is extruded in a continuous process in the form of a cylinder with a uniform structure. During the extrusion a constant temperature span is maintained at the die, not exceeding 340° C. Preferably, the mass resulting from such compression has a density in the range from 1.3 to 1.5 g/cm$^3$.

The subject of the present invention is also a device for the manufacture of briquettes from comminuted straw, said device having disposed in the barrel a three-segment screw with different helix pitches, said segment pitches decreasing toward the outlet. The forming die, disposed downstream the screw, is housed in a tank connected via a water system to a pump and a fanned cooler.

Preferably, a temperature indicator and a temperature sensor are installed inside the tank, integrated into the supply system of the pump.

The barrel chute is connected to a hopper equipped with a screw feeder driven by a separate motor. The motor of the screw feeder is equipped with a rotation speed controller. Screw feeder helix mates the arms of a rotating scraper installed on an inclined wall of the hopper.

ADVANTAGEOUS EFFECTS OF INVENTION

The method according to the present invention allows obtaining briquettes with a uniform structure throughout the transverse cross section. The feedstock, heated uniformly throughout its mass has a stable form that does not change during long storage. In steam environment, the raw material is converted into compact briquettes. This process of briquette manufacture results in obtaining a 100% natural and ecological fuel. Since the final product is characterized by a compact structure, its combustion is a process of long duration.

The briquetting device according to the present invention is energy-efficient, because attaining the right temperature does not require any heaters. The hopper ensures continuous and uniform feeding of the raw material in the form of comminuted straw. The device is also able to operate at negative temperatures.

DESCRIPTION OF EMBODIMENTS

Example 1

First, comminuted rye straw was prepared in a comminutor, then the straw was pre-dried to 20% moisture and fed to the briquetting machine's hopper. After the hopper had been filled with the comminuted straw, the screw feeder and the extruder screw were started simultaneously. The straw was gradually compressed. Screw rotation speed was initially set at 5 rpm and the machine operated at that speed until steam appeared at the outlet of guide 10, then the speed was increased to 25 rpm. During the operation of the extruder screw, the temperature of the raw materials was rising. Initially, the stabilizing sleeve produced incompletely solidified briquettes. After 5 minutes, as a result of temperature rise, the outgoing product in cylindrical form had reached the required density of 1.3 g/cm$^3$. The temperature sensor of the cooling system was set at 50° C. After that value had been exceeded, the cooling system pump was started. Further, the process ran in a continuous mode, provided that the material in the hopper was made-up when necessary. In case that excessive accumulation of raw material is found at the hopper outlet, the rotation speed of the screw feeder driving motor is reduced.

Example 2

Comminuted straw, pre-dried to 15% moisture, was fed to the briquetting machine's hopper and processed like in Example 1. The product obtained in the form of a cylinder had a density of 1.4 g/cm$^3$.

Example 3

Figure 2:
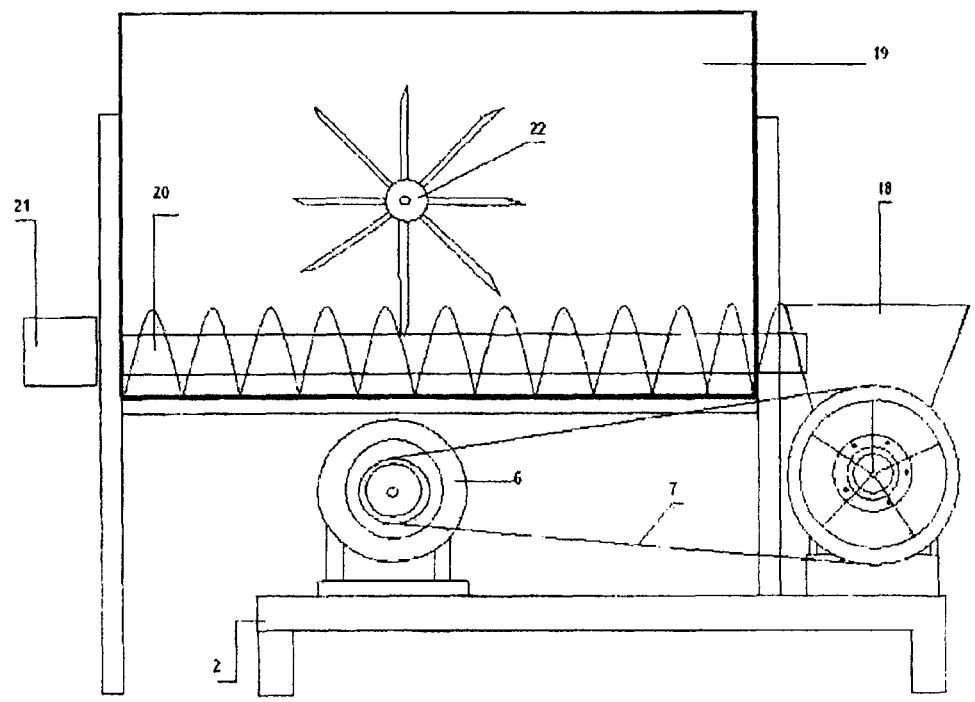

A device for the manufacture of briquettes is reproduced, as an example, in the enclosed drawing in which FIG. 1 shows the device in partial cross section along the axis of the barrel, and FIG. 2 is a side view with a section of the hopper.

Inside the barrel 1 which is seated on a foundation 2 there is disposed a screw 3 whose shaft 4, supported on bearings 5, is driven by an electric motor 6 through a belt transmission 7. The screw 3 has three helix segments of decreasing pitch toward the outlet. Bolted at the face of the barrel 1 is a forming die 8 having a conical bore, which is connected to a stabilizing sleeve 9. The stabilizing sleeve 9 has a guide 10 attached to it. The forming die 8 is housed in a cooling liquid tank 11 which is connected through the water system 12 to a fanned cooler 13 equipped with a fan 14. The water system 12 is equipped with a pump 15 and a temperature indicator 16, while at the tank 11 a temperature sensor 17 is installed which is part of the supply system of the pump 15. The barrel 1 has a chute 18 connected to a hopper 19, at the bottom of which there is a screw feeder 20 driven by an electric motor 21 while on an inclined wall of tank 19 a rotary scraper 22 is installed whose ends mate the helix of the screw feeder 20.

Although the present invention has been described with reference to preferred embodiments, workers skilled in the art will recognize that changes may be made in form and detail without departing from the spirit and scope of the invention.

The invention claimed is:

1. A method for making briquettes from cereal straw which is comminuted and then pressed, characterized in that the comminuted straw, pre-dried to a moisture content of 15-20%, is fed to a screw-type extruder and then gradually compressed until the straw reaches a temperature above 290° C. and density above 1.3 g/cm$^3$, and a resulting mass is extruded in a form of a cylinder having a homogeneous structure.

\* \* \* \* \*